Patented July 20, 1926.

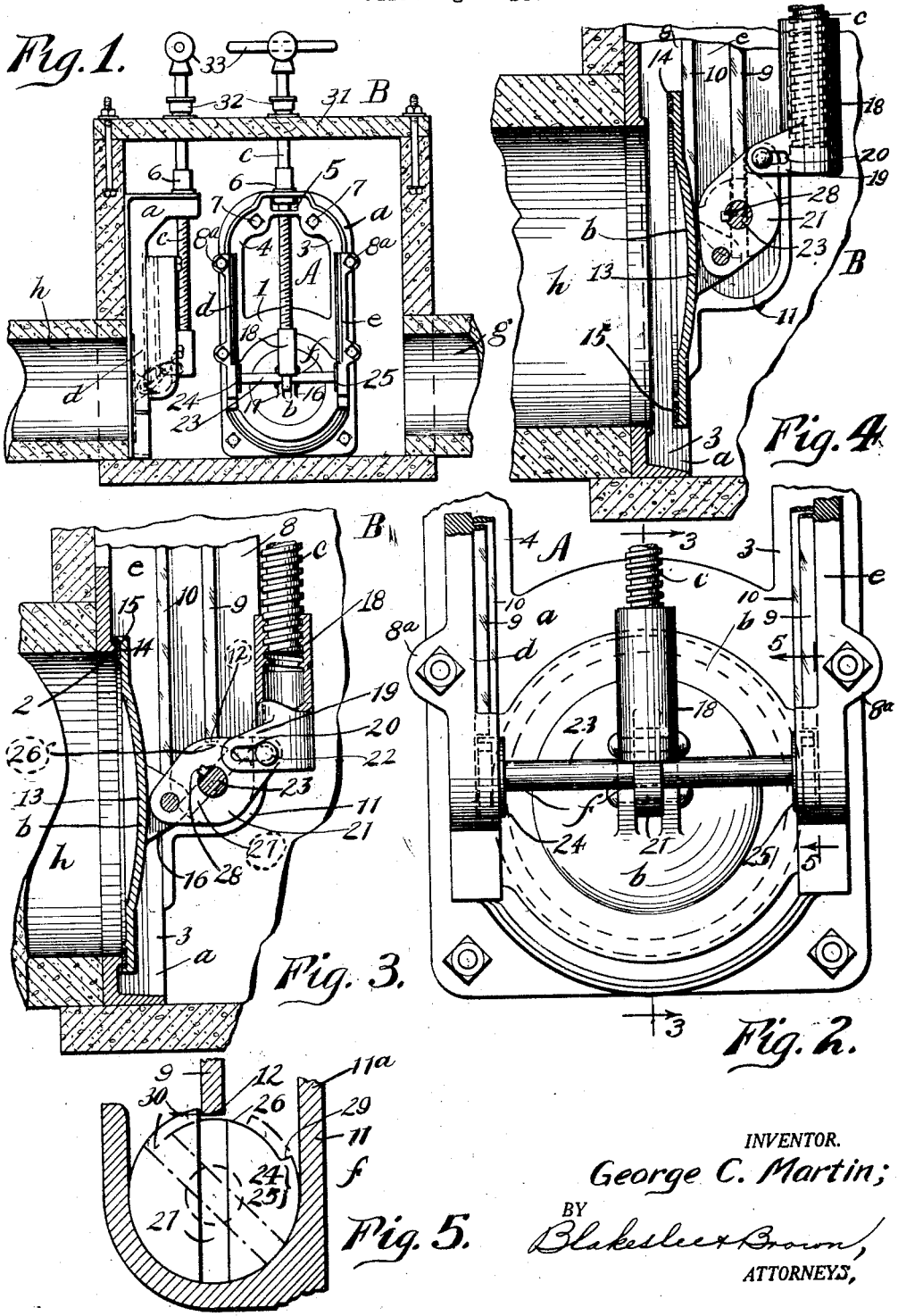

1,592,986

UNITED STATES PATENT OFFICE.

GEORGE C. MARTIN, OF LOS ANGELES, CALIFORNIA.

VALVE.

Application filed August 14, 1923. Serial No. 657,306.

This invention relates to valves, and particularly to a valve for use in controlling the flow of liquids such as water, adapted to be passed through conduits. In application, the said valves may be incorporated within a closed stand box, and placed in front of conduits leading from such box. Such structure is ordinarily used in orchards, and water or other liquid is distributed from such box to point of use.

Valves of different form, whether gate or otherwise, have been incorporated in stand boxes, but so far as the inventor is aware, no suitable form of gate valve has ever successfully been provided which utilizes a gasket for positively assuring that the said gate may be tightly wedged upon its seat. It is true that gaskets have been used, but if the gate is not properly seated, the rapid flow through a conduit of liquid which often bears sand or other débris, will cut the gasket and render it useless within a short time.

The present invention has for an object the provision of a valve which will securely close an orifice with an even pressure, which will be positive assurance against leakage, and which may be readily unseated without undue effort on the part of the operator.

A further object is the provision of a gate valve, which gate may be lowered under control of the operator to a definite position, and then moved inwardly toward its valve seat by a continuous operation of a single operating member.

In practicing the invention, I provide a suitable frame within which is guided a gate or slide, operated through the medium of a threaded shaft. Upon a turning of the shaft, the gate is raised or lowered within the frame, and when the gate is to close a conduit, a continuous turning of the shaft will first lower the gate to a position in front of and in advance of the conduit, and a valve seat associated with the frame, and then to move the gate directly toward the valve seat for engagement with such seat. The degree of pressure between the gate and its seat is regulated by a turning of the threaded shaft.

With the above and other objects in view, the invention consists in the novel and useful provision, formation, construction, association and interrelation of various parts, members and features, all as shown in one embodiment in the accompanying drawing, described generally, and pointed out more particularly in the appended claims.

In the drawing:

Fig. 1 is a fragmentary transverse sectional view of a closed stand box, having lateral conduits opening therein, and with the improved valves installed within said stand box for controlling the flow of liquid, such as water, through the conduits;

Fig. 2 is a fragmentary enlarged view of a lower portion of the valve frame and gate member, said view being on an enlarged scale;

Fig. 3 is a fragmentary enlarged view taken on the line 3—3 of Fig. 2 and looking in the direction of the appended arrows, the gate being seated;

Fig. 4 is a view similar to Fig. 3, and showing the gate removed from its seat; and Fig. 5 is a fragmentary cross-sectional view on an enlarged scale, and taken on the line 5—5 of Fig. 2 and looking in the direction of the appended arrows.

Corresponding parts in all the figures are designated by the same reference characters.

Referring now with particularity to the drawing, I have therein illustrated one embodiment of my improved valve, which I designate as an entirety by A, and of such valve *a* is a frame, *b* a gate or slide, *c* a shaft, *d* and *e* guide strips associated with the frame, and *f* means for controlling the closing of the gate *b* upon its seat or the raising thereof.

In the showing of Fig. 1 I have illustrated my improved valve A as incorporated in a closed stand box B, the said stand box having conduits entering therein, one of which, as *g*, is a main line conduit from a source of liquid supply, while others, designated as *h*, likewise enter within the stand box but have their orifice openings controlled by the valves A. The conduits *h* may be termed laterals and are adapted to be placed underground and to communicate with various stands in the field. The frame member *a* in the showing has a body portion 1 formed with an opening 2, which opening may correspond in size to the inner diameter of the conduit opening *h*. The frame is provided likewise with two spaced side members 3 and 4, associated with the body portion 1, which side members are curved at their extremities as shown at 5 and joined together.

Their point of jointure, as shown at 5, is so formed as to confine a guide or box 6, through which box 6 the stem c is passed. The frames as just described may be secured to the sides of the stand box by any suitable means such as bolts 7, and said frame is standard as to form with the exception of certain parts used in practicing the present invention.

Adapted to be secured to the frame and particularly the sides 3 and 4, and to a portion of the body, are the guide strip members d and e. These guide strips are identical in form and are constructed in a similar manner, and therefore like reference characters will apply. Describing the guide strip e the same comprises a strip or side member 8, having thereon outwardly projecting spaced flanges or guides 9 and 10. Secured to the part 8 are lugs 8ª bored to permit the passage of bolts therethrough whereby the said members, either d or e, may be secured to the frame member and particularly the sides 3 and 4. It will be noted that the members d and e are spacedly mounted in parallelism in the showing of Figs. 1 and 2. The end portion of the side 8 of the guide e is provided with a curved flange 11, and the flange 9 is terminated as shown at 12 a distance above the inner surface of such curved flange 11. The gate or slide b is conventional in form, being domed as shown at 13, and likewise being annularly grooved as shown at 14 for the reception of a gasket 15 within such groove, and such gate or slide is formed with two spaced lugs 16 and 17. In order to raise or lower the gate or slide b, the screw threaded shaft c is provided, and which shaft extends, as stated, through the member 6 carried by the frame a, and downwardly to where the screw threads of such shaft are in engagement with an internally threaded annular nut 18. Said nut is formed with two spaced lugs 19, each provided with slots 20, and a link 21 is pivoted at one end between the lugs 16 and 17 of the gate or slide b with the other end thereof between the lugs 19, and held in such latter position by a pin 22 passed through such link and through the slots 20 of the lugs 19. The link 21 constitutes a portion of the means f and likewise constituting a portion of the means f is a bar 23 provided at its ends with members 24 and 25, the said members 24 and 25 being received when the gate is in its closed position, as shown in Fig. 3, upon the inner curved surface of the flange members 11. The members 24 and 25 are identical in form and one of the same will therefore be described. The member 24 is circular in form and provided at a portion thereof with a peripheral notch 26. The member 24 is likewise provided on its outer surface with a diametric groove 27. It is to be noted that the link 21 is keyed, as shown at 28, to the bar 23. The lower extremity of the member 9 is received within the peripheral notched portion 26 of the end 24, and will contact with the wall portions 29 or 30, when the members 24 is rotated upon movement of the link 21.

The top 31 of the stand box is bored so that the member c may be passed therethrough, and the threaded shaft may have a stuffing box placed immediately above such opening in the top 31 with the shaft passed through such stuffing box. The end of the shaft may be provided with the usual handle 33, whereby the said shaft may be turned.

The operation of the device is as follows:

If we assume that water or other liquid has entered through the conduit g into the stand box b, and that it is desired to distribute the liquid from such box into one or the other or both of the lateral conduits h, the valve a may be operated to permit the flow of liquid through one or both of the conduits by turning the shaft c through the medium of the handle 33. Assuming that the gate or slide b is seated, as shown in Fig. 3, a turning of the handle 33 to rotate the shaft c to the right, will cause the nut 18 to pass upwardly upon the shaft for the reason that the shaft is non-rising, being held in a definite position by the guide or box 6. Raising the nut will turn the link 21, the link being turned for the reason that the guides 9 carried by the members d and e, are immediately above the surface of the notched portion of the ends 24 and 25, thereby holding the ends in the pockets formed by the curved flanges 11. Thus the first movement will be to rotate the link and the ends 24 and 25, which will move the gate or slide b from its seat to the position as illustrated in Fig. 4. This movement will rotate the members 24 and 25 until the facial grooves 27 in such members are in alignment with the members 9 carried by the members d and e, further rotation of the bar 23 and the link 21 being prevented by the extremities 12 of the members 9, contacting with the ends 29 of the members 24 and 25. As the handle 33 is further rotated, the members 9 will enter the slots or grooves 27 in the members 24 and 25. The gate or slide b will be guided in its upward movement by contacting with the members 10, and the gate lifted or elevated above the opening 2 in the frame to any desired height. It will thus be seen that I have provided a valve which will, upon a continuous rotation of a threaded shaft, lower a gate to a position in front of its valve seat, then upon further rotation move said gate towards its valve seat or, in other words, will move the gate in a given plane until it reaches a given position, and then move it in a second plane at angles to the first, and then wedge said gate tightly upon its seat, the seating pressure being regulated by the number of turns given the shaft.

Particular attention is directed to the fact that the inner surface of the curved flanges 11 act as bearing surfaces for the terminal members 24 and 25. In other words, when the gate has been lowered sufficiently, the terminal members will be in engagement with the inner curved surface of the members 11, and will rotate upon such surfaces, due to movement given the link member 21. The members 24 and 25, of course, act as pressure bearings in that a rotation of the link by forcing the gate upon its seat, re-conducts the force of such seating pressure against the flange members 11, as illustrated in Fig. 3, and to this end a portion of the flange 11 parallels the flanges 9 and 10, as shown at 11$^a$.

So far as the inventor is aware, no valve has yet been produced, outside of this one, which upon a continuous rotation of the shaft, will first lower the gate and then wedge the gate against its seat, or upon a counter rotation of the shaft, move the gate from its seat and then raise the same.

It is obvious that various changes, modifications and variations may be made in practicing the invention in departure from the particular description as given, and that said changes may be made within a fair interpretation of the invention as set forth and claimed.

Having thus described my invention, what I claim and desire to secure by Letters Patent is:

1. A valve, including a frame member, guides carried by said frame member, a gate member, a bar provided with terminal members, slots within such terminal members, and a link between such gate and bar, and means associated with the link and adapted, upon movement, to rotate the link and the bar to move the gate in a given direction.

2. A valve, including a frame member, guides carried by said frame member, a gate member, a bar provided with terminal members, slots within such terminal members, and a link between such gate and bar, and means associated with the link and adapted, upon movement, to rotate the link and the bar to move the gate in a given direction until certain of the guides are in alignment with the slots in the terminal members of the bar, whereupon the gate may be moved in a second direction.

3. A valve, including a frame member, guides carried by said frame member, a gate member, a bar provided with terminal members, slots within such terminal members, and a link between such gate and bar, means associated with the link and adapted, upon movement, to rotate the link and the bar to move the gate in a given direction until certain of the guides are in alignment with the slots in the terminal members of the bar, whereupon the gate may be moved in a second direction; there being a pocket member for holding one of such terminal portions when the gate is in one position.

4. Improvements in valves, including a frame, guides carried by the frame, a gate, a bar provided with terminal members, and a link carried on such bar and carrying the gate; there being a non-rising screw-threaded shaft, a threaded nut carried by such screw-threaded shaft and associated with the link, said non-rising shaft when rotated in one direction causing movement of the nut to rotate the link and the terminal members to move the gate; one of such guides cooperating with the terminal members to permit rotation thereof until the gate has moved a certain distance, whereupon the terminal members may slide upon such guides.

5. Improvements in valves, including a frame, guides carried by the frame, a gate, a bar provided with terminal members, and a link carried on such bar and carrying the gate; there being a non-rising screw-threaded shaft, a threaded nut carried by such screw-threaded shaft and associated with the link, said non-rising shaft when rotated in one direction causing movement of the nut to rotate the link and the terminal members to move the gate; one of such guides cooperating with the terminal members to permit rotation thereof until the gate has moved a certain distance, whereupon the terminal members may slide upon such guides; further guides being provided for guiding movement of the gate during a raising or lowering thereof.

In testimony whereof, I have signed my name to this specification.

GEORGE C. MARTIN.